Feb. 21, 1928.
G. A. JARVIS
1,659,876
TRACTOR HITCH
Filed May 5, 1927
2 Sheets-Sheet 1
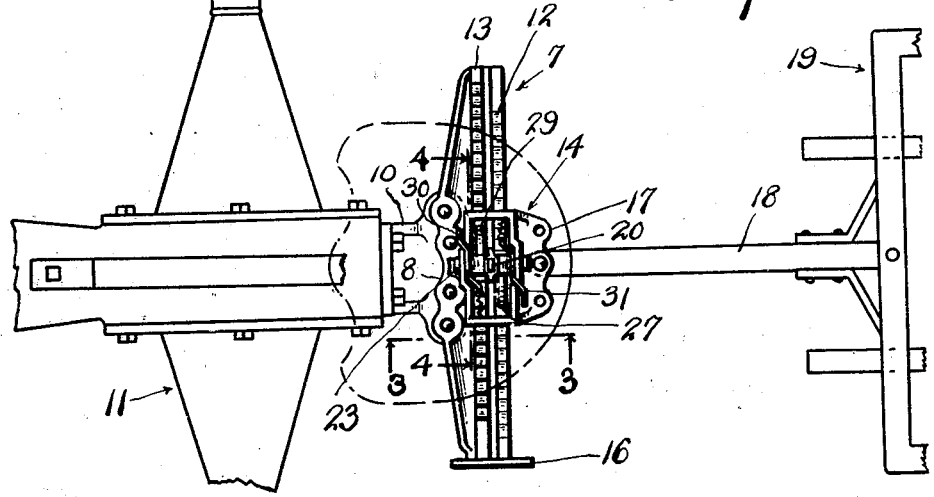
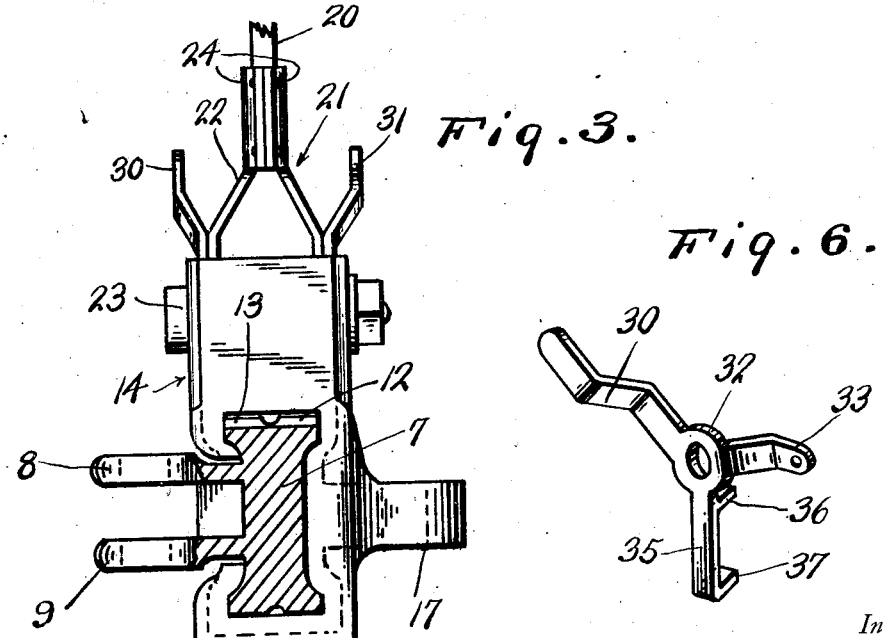
Inventor
Gunnard A. Jarvis
By Clarence A O'Brien
Attorney

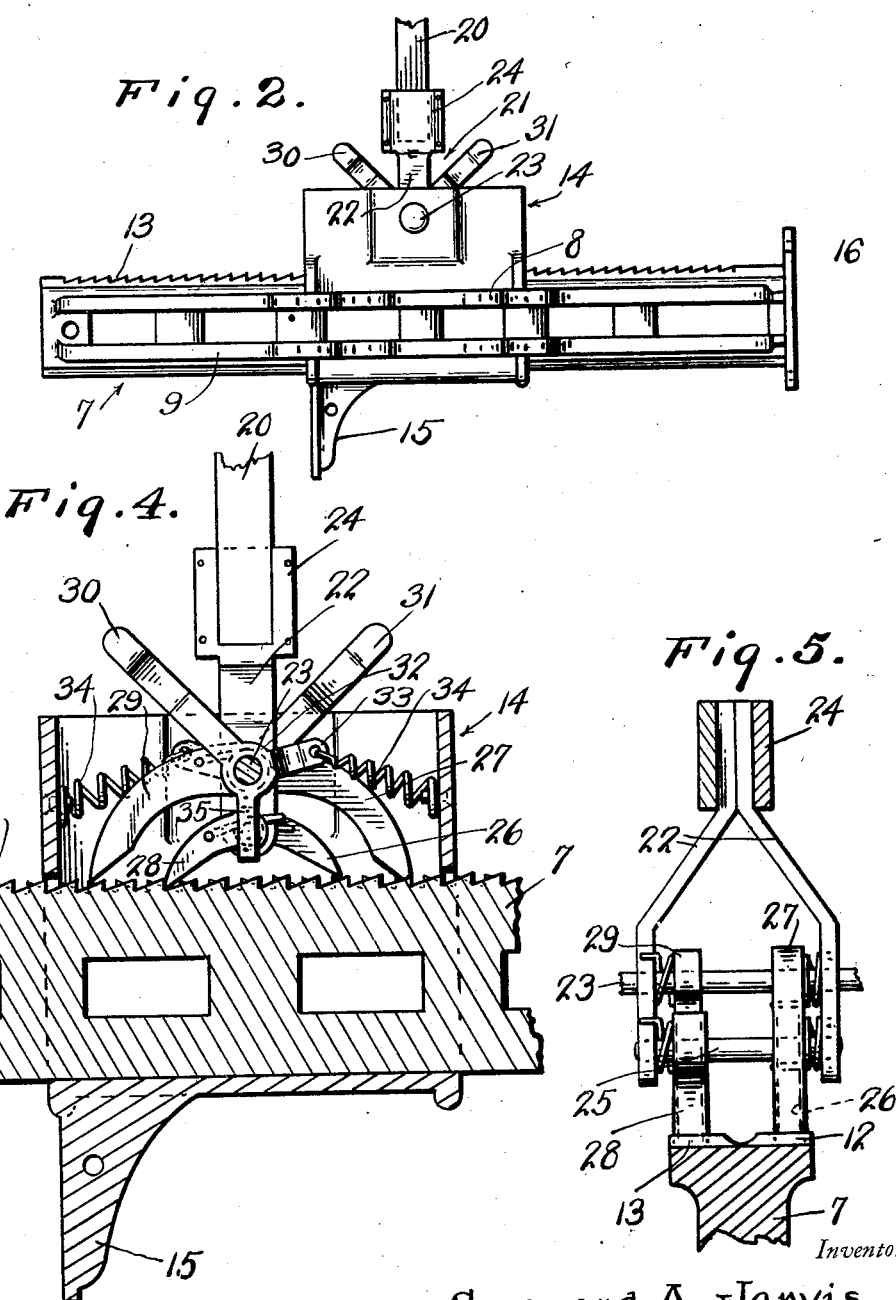

Patented Feb. 21, 1928.

1,659,876

UNITED STATES PATENT OFFICE.

GUNNARD A. JARVIS, OF MONONGAHELA, PENNSYLVANIA.

TRACTOR HITCH.

Application filed May 5, 1927. Serial No. 189,004.

The present invention relates to an improved tractor hitch such as is employed for coupling a trailer or a plow to a tractor, or a similar vehicle.

It has been observed that when the tractor is utilized for propelling a plow or the like on a hill or up-grade, the power is frequently transmitted in an uneven manner, and in view of this, I have devised a special kind of a hitch which includes adjustable means whereby the line of draft can be offset to either one or the other side of the line of pull in order to obtain more efficient results.

My principal aim is to provide a structure of this kind which, it is believed, will supersede similar devices employed for the same purpose.

I propose a structure which, it is thought, is unequaled in the art and one which is practical and modern, and includes distinguishing features both from a structural, as well as advantageous standpoint.

The particular details and organizations thereof will become more readily apparent from the following description and drawings.

In the drawings:—

Figure 1 is a top plan view of the rear end portion of a tractor, showing the improved hitch and the method of connecting a trailer or equivalent structure therewith.

Fig. 2 is a front elevation of the improved hitch, as constructed in accordance with the invention.

Fig. 3 is a transverse section through one end portion, the section being on the plane of the line 3—3 of Fig. 1.

Fig. 4 is an enlarged fragmentary longitudinal section and elevational view showing the pawl and ratchet mechanism in detail, the section being on the line 4—4 of Fig. 1.

Fig. 5 is a section similar to Fig. 3, showing the slidable housing removed.

Fig. 6 is a detail perspective view of one of the pawl release latches.

Referring now to the drawings in detail, it will be seen that the reference character 7 designates generally a casting in the form of an elongated I-beam formed on the front side with an outstanding portion divided into upper and lower flanges 8 and 9, these flanges being suitably reinforced and constructed to provide attaching ears which are bolted or otherwise fastened to the casting 10 on the rear end of the tractor 11 as shown in Fig. 1.

The upper side of this beam 7 is formed with two rows of rack teeth 12 and 13 respectively, the teeth of one row being disposed in a direction opposite to those of the other row.

Slidably mounted on this beam is a slide which is generally designated by the reference character 4, the same being of hollow box-like configuration, and being slotted on one side to accommodate the aforesaid flanges 8 and 9 as shown plainly in Fig. 3. The edge portions of the slots are turned inwardly to engage on the beam in order to hold the slide firmly in place. Incidentally, this slide is formed on one side with a right angularly disposed lug 15 which serves a purpose to be hereinafter described.

Cooperating with this lug, is a base 16 which is formed on one end with the beam. Also carried by the slide on one side is an outstanding attaching flange 17 (see Figs. 1 and 3) with apertures to permit connection of a draft tongue 18 thereto. The tongue may be that of a trailer 19 as shown in Fig. 1, a plow or suitable conveyance to be hauled.

Attention is now invited to Figs. 3 and 4 wherein it will be seen that the reference character 20 designates an operating lever which is connected at its lower end with a fork 21, the arms 22 of which are rockably mounted on a fulcrum pin 23 in the housing. The upper ends of the arms are formed with plate sections 24 which are bolted together to provide a socket for the lower end of the lever. Also, the free end portions of the arms 22 are provided with a pin 25.

Cooperating with the fulcrum 23 as well as the pin 25, we find two sets of pawls, the pawls of one set being designated by the reference characters 26 and 27, and the pawls of the other set being designated by the reference characters 28 and 29. Incidentally, the pawls 26 and 28 are small, while the pawls 27 and 29 are large. Also the pawls 26 and 27 engage the rack teeth 12, while the remaining pawls 28 and 29 engage the rack teeth 13.

Moreover, the large pawls 27 and 29 are rockably mounted on the fulcrum 23, while the small pawls 26 and 28 are rockably mounted on the pins 25. In connection with the pawls, I provide releasing latches 30 and 31, each of which is of the construction shown in Fig. 6. Directing attention to this figure, it will be seen that the latch comprises a suitably shaped handle portion, a hub 32, rockably mounted on the fulcrum, an outstanding arm 33 for attachment of the coiled spring 34, and a depending leg 35 carrying inwardly directed ears 36 and 37. Obviously, the ears 36 and 37 are located to engage beneath the complemental pawls for lifting them up and disengaging them from the ratchet teeth.

With this arrangement, it is obvious that the pawls of either set can be disengaged so that only the pawls of the other set will be engaged for operation. It is also obvious that when the latches 30 and 31 are in the position shown in Fig. 4, both sets of pawls are engaged, thus locking the slide 14 in place on the beam.

If it is desired to shift the attaching flange 17 and slide 14 to one side of the longitudinal center, the proper set of pawls are disengaged and the lever is manipulated to feed the slide in the desired direction. When it reaches the desired point, the previously released pawls are permitted to resume the normal position on the slide, and it is thus retained in place.

The device is capable of being used as a lifting jack by employing the base 16 and disposing the beam in a vertical position, at which time it operates as an ordinary standard. At this time, the outstanding lug 15 provides the customary seat or rest for the object to be lifted.

The pawl and ratchet mechanism is operated in an obvious manner, and the latches are manipulated to permit the slide to move up or down as is desired. The device can also be used to a good advantage as a wire stretcher. Hence, the device in a sense, provides a readily convertible tool for handy farm use.

It is believed that by considering the drawings description together, a clear understanding of the construction and method of use, and advantages of the invention will be had. Therefore, a more lengthy description is thought unnecessary.

Minor changes in shape, size and rearrangement of parts, coming within the field of invention claimed may be resorted to if desired.

Having thus described my invention, what I claim as new is:—

1. In a structure of the class described, a body provided with individual rows of oppositely directed rack teeth, a slide mounted on said body and provided with a fulcrum, an operating lever pivotally mounted on said fulcrum, and separate sets of pawls cooperable with said lever and fulcrum, the pawls of one set being engageable with one row of teeth, and the pawls of the other set being engageable with the other row of teeth.

2. In a structure of the class described, a body provided with individual rows of oppositely directed rack teeth, a slide mounted on said body and provided with a fulcrum, an operating lever pivotally mounted on said fulcrum, and separate sets of pawls cooperable with said lever and fulcrum, the pawls of one set being engageable with one row of teeth and the pawls of the other set being engageable with the other row of teeth, and individual spring retained latches rockably mounted on said fulcrum and including means cooperable with said pawls for selectively disengaging said pawls.

3. In a structure of the class described, a beam provided with rack teeth on one side, provided with a base at one end, a slide mounted on said beam and provided with an outstanding lug providing a seat, an operating lever pivotally mounted on said slide, sets of individual pawls pivotally mounted on said slide and cooperable with the rack teeth, and individual release and retaining latches pivotally mounted upon said slide for simultaneously and selectively disengaging either set of said pawls.

4. In a structure of the class described, a beam provided with rack teeth formed in separate rows, a slide mounted on said beam, a fulcrum carried by said slide, a lever pivotally mounted on said fulcrum and provided with a pivot pin, a pair of relatively small pawls mounted on said pivot pin, a pair of relatively large pawls mounted on said fulcrum pin, retaining springs for said pawls, said pawls being arranged in sets of two for engaging the respective rows of rack teeth, and individual release latches swingably mounted on said fulcrum and cooperable with said pawls.

5. In a structure of the class described, a beam provided with rack teeth formed in separate rows, a slide mounted on said base, a fulcrum carried by said slide, a lever pivotally mounted on said fulcrum and provided with a pivot pin, a pair of relatively small pawls mounted on said pivot pin, a pair of relatively large pawls mounted on said fulcrum pin, retaining springs for said pawls, said pawls being arranged in sets of two for engaging the respective rows of rack teeth, individual release latches swingably mounted on said fulcrum and cooperable with said pawls, each latch having a retaining spring and a leg portion provided with inturned fingers engageable with the pivoted end portions of said pawls.

In testimony whereof I affix my signature.

GUNNARD A. JARVIS.